Patented Aug. 10, 1926.

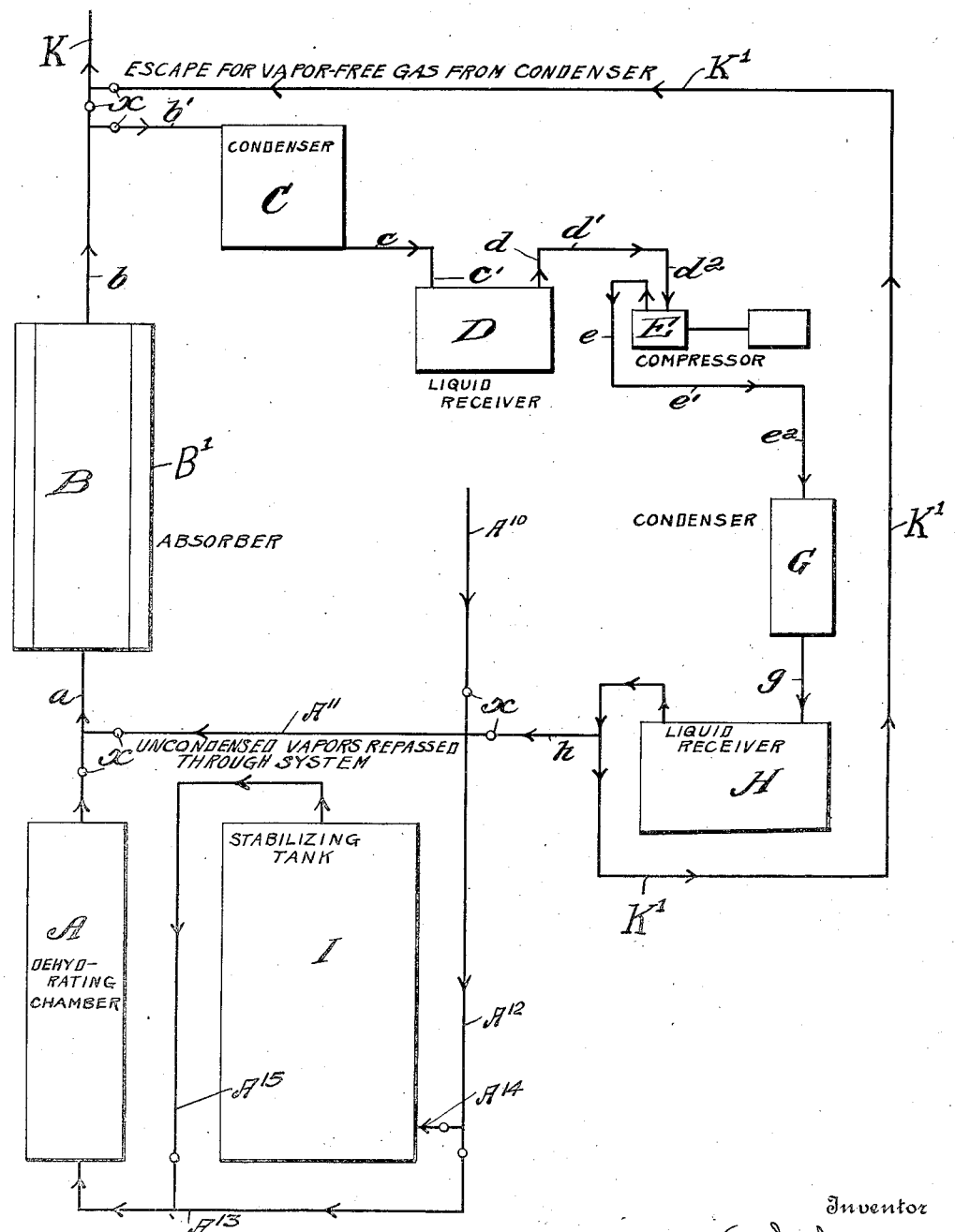

1,595,682

UNITED STATES PATENT OFFICE.

GEORGE G. OBERFELL, OF TULSA, OKLAHOMA, AND GEORGE A. BURRELL, OF PITTSBURGH, PENNSYLVANIA, ASSIGNORS TO GASOLINE RECOVERY CORPORATION, A CORPORATION OF DELAWARE.

PROCESS OF RECOVERING CONDENSABLE VAPORS FROM GAS MIXTURES.

Application filed May 20, 1919, Serial No. 298,559. Renewed January 5, 1926.

This invention relates to the recovery of liquefiable vapors from gases which carry them.

In many industrial operations, it frequently happens, that vapors of liquids which would be valuable if recovered and saved, are allowed to escape with various amounts of the gases which contain them.

This is true in the natural gas gasoline industry, where gasoline vapors, carried by natural gas, are absorbed by means of an oil menstruum from which they are later separated and recovered in liquid form by distillation or other methods, and also in the rubber industry, where gasoline vapors are mixed with air after use, and are usually lost. In both of these instances, it is often a fact, that not all of the gasoline vapors are recovered.

This loss also occurs in many chemical operations where vapors escape from gases and are entirely lost.

The object of this invention is to prevent this loss and to make possible a more complete recovery of such vapors.

It has been discovered by the applicants, that some solid substances and particularly charcoal and silica gel are adapted for use as absorbent media for vapors, and have not been proposed heretofore for such use, and one of the objects of this invention is to provide a process, in which solid substances may be used for this purpose.

Applicants have discovered that charcoal made from cocoanut shells, or other nut shells, hard coal, wood, etc., and which is made from such substances by first heating at about 1,000° C., for twelve hours, with subsequent cooling and reheating with air, steam, carbon dioxide or other suitable oxidizing agent, is particularly adapted for this purpose, as by this means there is produced a charcoal of exceptional absorbing qualities.

In order that the invention may be clearly understood, a drawing is filed herewith which shows diagrammatically a form of apparatus by which the invention may be practiced. In this drawing, A represents a dehydrating chamber in which any water vapor may be removed from the gas entering the chamber. B is an absorbing chamber, adapted to contain the solid absorbing substance. B' is a jacket surrounding the absorbing chamber, which may be filled with water or other agent for cooling the chamber, during the process of absorption and which may be used as a steam jacket, for heating the chamber when it is desired to recover from the solid absorbent the vapors absorbed by it.

C is a condenser, in which the vapors passing from the chamber B are condensed into liquid form. D is a receiving tank for the liquid, condensed in the chamber C. E is a pump or compressor for compressing any vapors which are not liquefied by the condenser C and which are drawn from the tank D.

G is a second condenser, into which the vapors, compressed by the pump E are forced, and where they are liquefied. H is a second receiving tank, for liquefied vapors from the condenser G. I is what may be termed a stabilizing tank, which insures a constant flow of gas and which may also be used as a storage tank for a second gas which may be circulated through the absorbing medium during distillation as hereinafter described.

The operation of the process is as follows:

The gas to be treated, carrying the recoverable vapors may be passed directly from the entrance pipe $A^{10}$ by way of pipes $A^{11}$ and $a$ into the absorbing vessel B, which has been first filled with a solid absorbing substance such as charcoal, preferably in granular form, or silica gel or other desired solid substance, or it may be first passed by way of pipes $A^{12}$ and $A^{13}$ through the dehydrator chamber A, where the water vapor is removed and thence into the absorbing chamber B through the pipe $a$, or it may be first run by way of pipes $A^{12}$ and $A^{14}$ into the stabilizing tank I, thence through the pipes $A^{15}$ and $A^{13}$ into the dehydrator chamber and into the absorber, as desired.

In the absorbing chamber, the solid medium absorbs the vapors carried by the gas, and the absorption is aided by supplying the jacket B' surrounding the vessel B, with a cooling medium such as water or other cooling agent.

The gas and vapors which have not been absorbed in the chamber B, pass out of the said chamber and may be led through the pipe K to a place of consumption.

When the absorbing medium has reached its absorption limit, the fresh incoming gas is passed into another chamber filled with fresh absorbing material.

In the recovery of the absorbed vapors from the solid absorbing substance the absorbing chamber B is heated, preferably by introducing steam into the jacket B′, surrounding the chamber B and the heat drives the absorbed vapors out of the absorbent material. These vapors are led by pipes $b$, $b'$ into the condenser C where they are cooled and condensed into liquid form in a well known manner, the liquid passing through pipes $c$, $c'$ into the receiving tank D.

It may happen that uncondensed vapors enter and accumulate in the tank D, in which event such vapors are pumped from the tank D through pipes $d$, $d'$, $d^2$, compressed by the pump E and forced through pipes $e$, $e'$, $e^2$ into a second condenser G from which the liquefied vapors are led to the receiving tank H by the pipe $g$. Any uncondensed vapors in the tank H are led through pipe $h$ back into the pipe $a$, to again be sent through the absorber, or may be passed into line K by way of line K′.

Suitable valves and cocks in the pipe lines are indicated on the drawing throughout the system by the letter X.

It may be stated that the release of the absorbed vapors from the absorbent is facilitated and expedited by applying suction to the absorbing chamber at the time of heating the chamber.

We have also discovered that some absorbed vapors may be more easily and more completely recovered by circulating another gas or vapor through the solid absorbing medium, the release of vapors in such case being facilitated, if the said gas or vapor is circulated at reduced pressure, while heating the absorbing medium.

For example, air which is practically free from vapor, if circulated through the heated absorbent, will remove vapor from the absorbent. The vapors thus removed are condensed and flow into the receiving tanks. These vapors may be more thoroughly removed from the air by passing it through a liquid absorbing medium, from which they may be recovered if desired by distillation.

The air, after being wholly or partly denuded of its absorbed vapors, may be circulated repeatedly through the solid absorbent until the solid absorbent is practically freed of its charge of condensable vapors.

We do not wish to limit ourselves to the exact details of procedure, as described and shown by the drawing, as obviously this drawing shows only one manner in which the process may be carried out. There are various ways in which the apparatus may be built, to absorb vapors in and to recover them from a solid absorbent, and various changes may be made in the process itself, without departing from the spirit of our invention.

We have found, for instance, that the introduction of a substance like glycerine into the charcoal in the absorbing chamber at the time of heating the chamber to recover the vapors, hastens the distillation, the glycerine entering the pores of the charcoal and driving the vapors out.

What we claim and desire to secure by Letters Patent is:—

1. The process of removing hydrocarbon vapors from a gas mixture and recovering them in liquid form, which consists in passing the gas mixture through a solid absorbent medium consisting of activated charcoal which absorbs the vapors, then subjecting the solid absorbent to heat, while under a pressure, to drive the absorbed vapors out of the absorbent, then condensing a portion of the vapors driven off, at a relatively low temperature, then compressing the remaining portion of said vapors at a pressure greater than that of the atmosphere and condensing the same.

2. The process of recovering liquefiable vapors from a gas mixture which consists in absorbing the vapors in a solid absorbing medium consisting of activated charcoal, then removing the absorbed vapors from the medium by heating the latter and by circulating another gas through the solid absorbent while heating the same at a pressure, and then condensing the vapors in the circulating gas by cooling.

3. The process of recovering liquefiable vapors from a gas mixture, which consists in absorbing the vapors in a solid absorbing medium consisting of activated charcoal, then removing the absorbed vapors from the medium by heating the latter and by circulating another gas through the solid absorbent while heating the same, at a pressure, then condensing a part of the vapors in the circulating gas by cooling, then compressing the remaining portion of the vapors at a pressure greater than one atmosphere and then condensing the same.

4. A process of recovering vapors of substances which are liquid under atmospheric temperature and pressure from a gas mixture, consisting in absorbing the vapors in activated charcoal, distilling the absorbed vapors from the charcoal, condensing a portion of the vapors distilled from the charcoal, subjecting the vapors remaining from said condensation to pressure, and subsequently condensing said compressed vapors.

In testimony whereof we affix our signatures.

GEORGE G. OBERFELL.
GEORGE A. BURRELL.